(12) United States Patent
Dajnowski et al.

(10) Patent No.: US 10,377,642 B2
(45) Date of Patent: Aug. 13, 2019

(54) LASER ABLATION AND FILTRATION APPARATUS AND PROCESS FOR REMOVAL OF HYDROCARBONS AND CONTAMINANTS

(71) Applicants: Bartosz A. Dajnowski, Oak Brook, IL (US); Magdalena Dajnowski, Oak Brook, IL (US); Frank Richerand, Sr., Covington, LA (US); Frank Richerand, II, Folsom, CA (US); Chuck Boutall, Kiln, MS (US)

(72) Inventors: Bartosz A. Dajnowski, Oak Brook, IL (US); Magdalena Dajnowski, Oak Brook, IL (US); Frank Richerand, Sr., Covington, LA (US); Frank Richerand, II, Folsom, CA (US); Chuck Boutall, Kiln, MS (US)

( * ) Notice: Subject to any disclaimer, the term of this patent is extended or adjusted under 35 U.S.C. 154(b) by 0 days.

(21) Appl. No.: 15/351,304

(22) Filed: Nov. 14, 2016

(65) Prior Publication Data

US 2017/0217792 A1    Aug. 3, 2017

Related U.S. Application Data

(60) Provisional application No. 62/255,156, filed on Nov. 13, 2015.

(51) Int. Cl.
*C02F 1/00* (2006.01)
*C02F 1/30* (2006.01)
(Continued)

(52) U.S. Cl.
CPC ............ *C02F 1/325* (2013.01); *C02F 1/001* (2013.01); *C02F 1/30* (2013.01); *C02F 1/40* (2013.01);
(Continued)

(58) Field of Classification Search
None
See application file for complete search history.

(56) References Cited

U.S. PATENT DOCUMENTS 4,661,264 A * 4/1987 Goudy, Jr. ............... A61L 2/10
210/748.06
5,984,032 A   11/1999 Gremillion et al.
(Continued)

FOREIGN PATENT DOCUMENTS

EP    0798270         10/1997
JP    2001231881 A  *  8/2001
WO    0160418          8/2001

OTHER PUBLICATIONS

JP 2001231881 Machine Translation—Minehara et al—Aug. 28, 2001 (Year: 2001).*
(Continued)

*Primary Examiner* — Krishnan S Menon
*Assistant Examiner* — Bradley R Spies
(74) *Attorney, Agent, or Firm* — Garvey, Smith & Nehrbass, Patent Attorneys, L.L.C.; Julia M. FitzPatrick; Gregory C. Smith

(57) ABSTRACT

A laser ablation and filtration process and apparatus wherein liquid containing hydrocarbons or other contaminates is purified. The liquid is exposed to laser energy at one or more selected wavelengths wherein the laser energy travels through the liquid and reaches the hydrocarbons or other contaminates and vaporizes, denatures, breaks down, neutralizes, renders inert and/or separates the hydrocarbons or contaminates from the liquid. A laser source is positioned in or on a vessel based on pre-set parameters to maximize exposure of the liquid to the laser energy, including sizing parameters, angle and inclination of the laser, retention time for the laser process to be applied and geometry of the containment for proper inclination. One or more collection (Continued)

chambers, which may include perforated membranes may be included to collect gases, separated hydrocarbons or contaminates and other by-products of the process. The vessel utilized may be submergible in water to pull or flow contaminated water therethough. The vessel may also be utilized outside a body of water wherein contaminated water from a source is introduced within the vessel.

44 Claims, 15 Drawing Sheets

(51) Int. Cl.
  *C02F 1/32* (2006.01)
  *C02F 1/40* (2006.01)
  *C02F 101/32* (2006.01)
(52) U.S. Cl.
  CPC .... *C02F 2101/32* (2013.01); *C02F 2201/326* (2013.01); *C02F 2201/3226* (2013.01); *C02F 2201/3228* (2013.01); *C02F 2303/04* (2013.01)

(56) References Cited

U.S. PATENT DOCUMENTS

| | | | |
|---|---|---|---|
| 8,075,783 | B2 | 12/2011 | Jensen et al. |
| 8,539,899 | B2 | 9/2013 | Gimpel et al. |
| 9,284,001 | B2 | 3/2016 | Schmidt et al. |
| 2002/0114745 | A1 | 8/2002 | Elliott et al. |
| 2006/0207431 | A1* | 9/2006 | Baca ............ A61L 2/0011 96/224 |
| 2007/0170121 | A1 | 7/2007 | Mukaddam et al. |
| 2008/0128283 | A1 | 6/2008 | Van Rensburg |
| 2010/0051546 | A1* | 3/2010 | Vuong ............ B01D 61/027 210/637 |

OTHER PUBLICATIONS

USGS OpenFile Report 20101101: A Method for Qualitative Mapping of Thick Oil Spills Using Imaging Spectroscopy (May 14, 2010).
Optical Absorption of Water Compendium (May 11, 1998).
Detecting Oil Spill Contamination Using Airborne Hyperspectral Data in the River Nile, Egypt, Open Journal of Marine Science, 2014, 4, 140-150 (Apr. 2014).
PCT International Search Report and Preliminary Opinion, dated Mar. 14, 2017, for international application serial No. PCT/US16/61920.
Table showing Absorption Spectrum of Liquid Water, available at https://en.wikipedia.org/wiki/Electromagnetic_absorption_by_water#/media/File:Absorption_spectrum_of_liquid_waterpng (last visited Sep. 1, 2018).

* cited by examiner

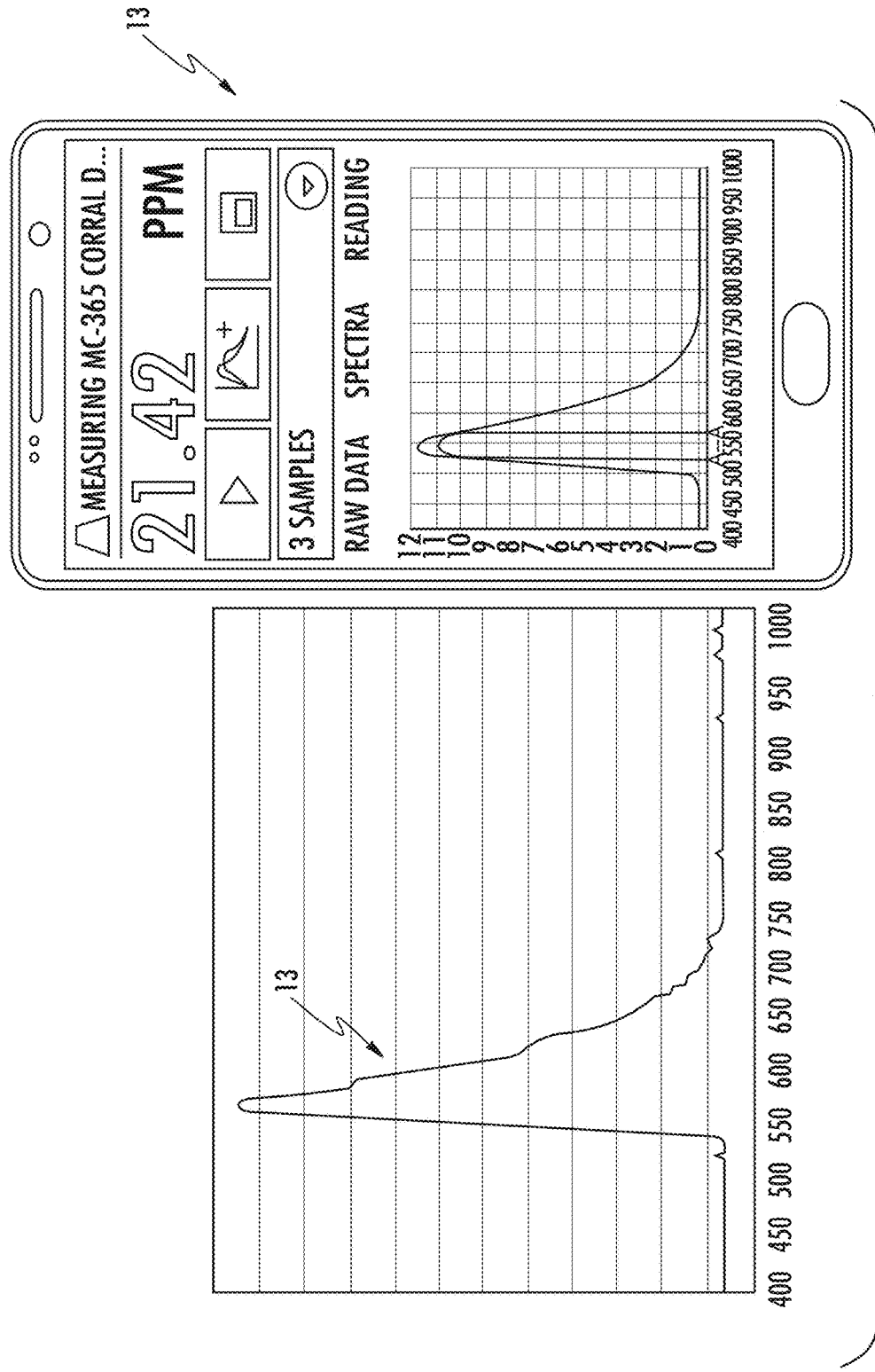

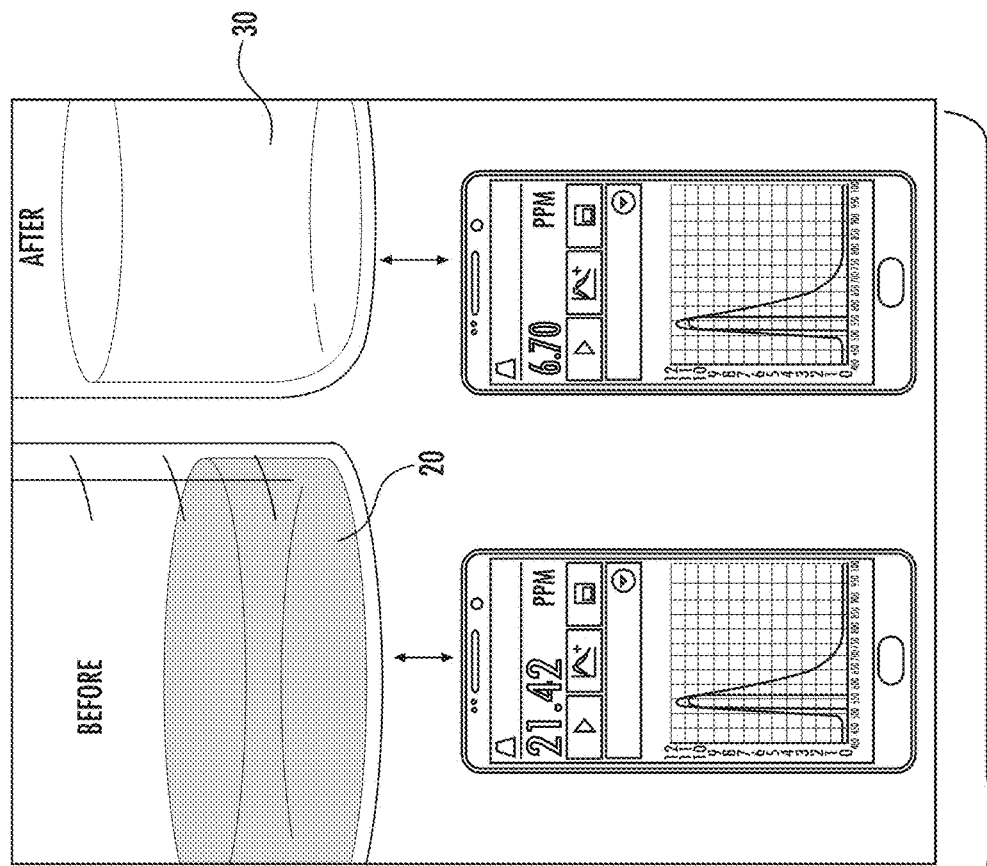
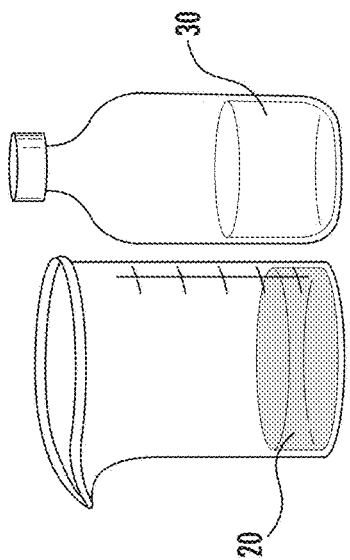
FIG. 4

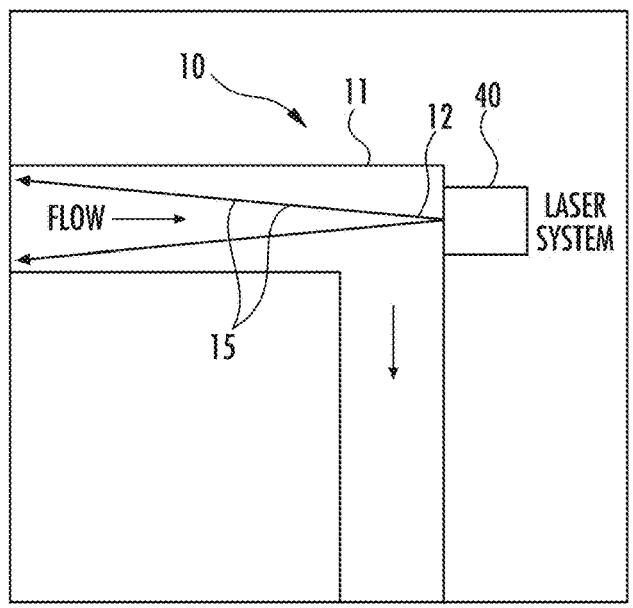
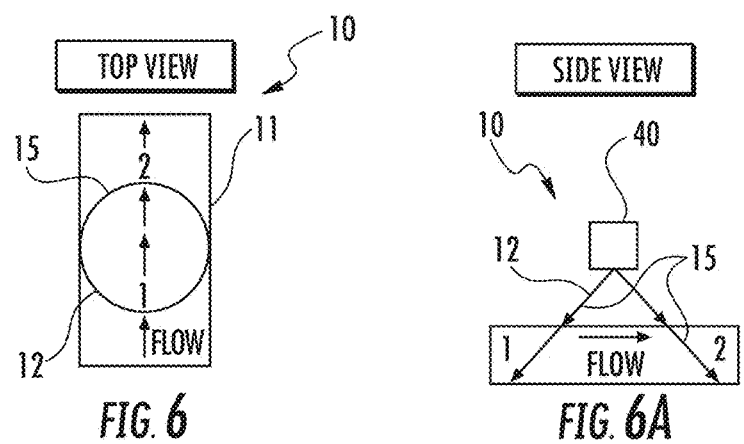
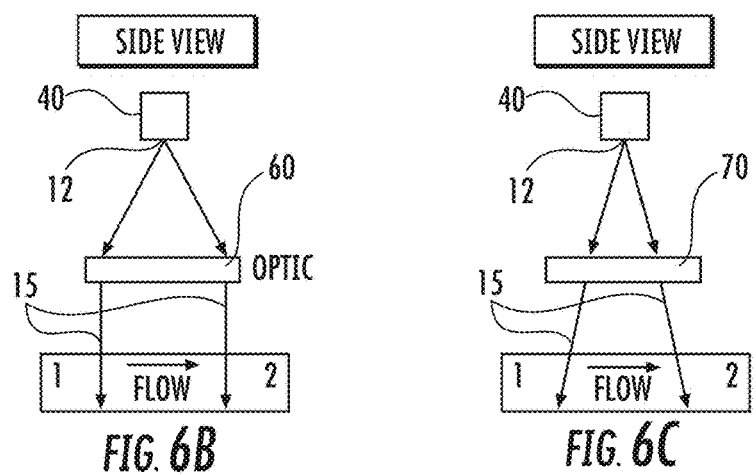

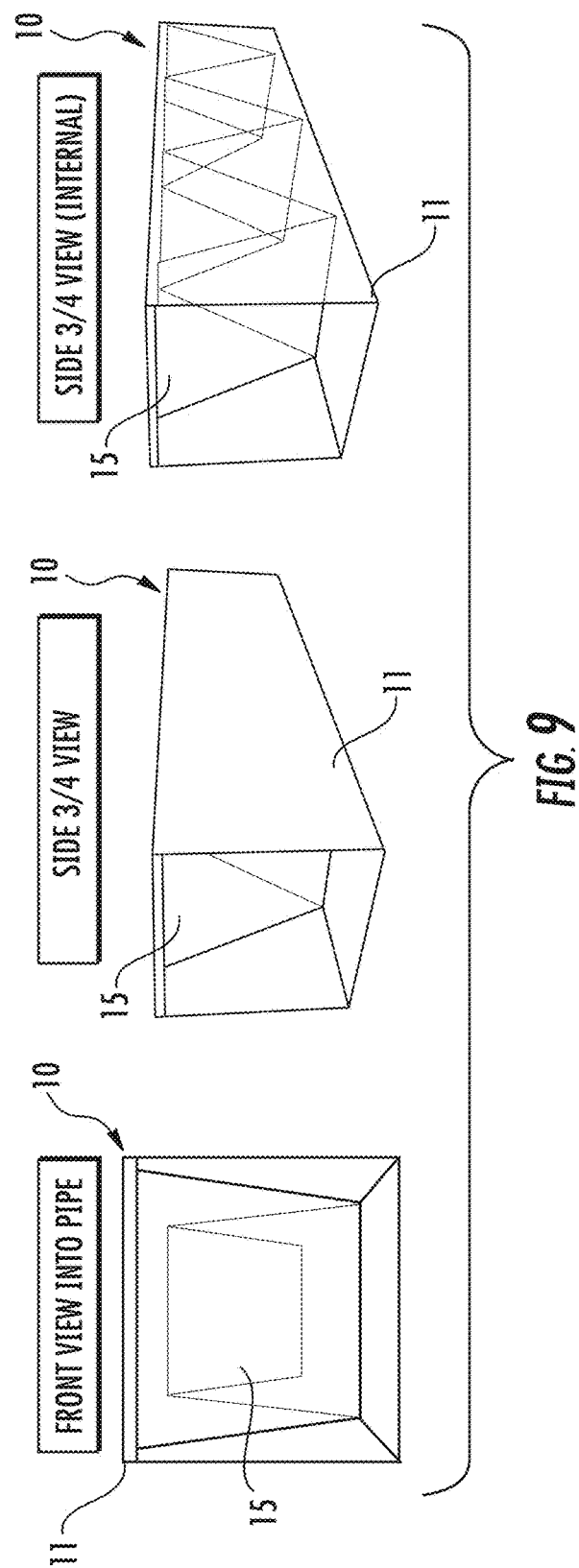

20

LASER ABLATION AND FILTRATION APPARATUS AND PROCESS FOR REMOVAL OF HYDROCARBONS AND CONTAMINANTS

CROSS-REFERENCE TO RELATED APPLICATIONS

This application claims the benefit of and/or priority to U.S. Provisional Patent Application Ser. No. 62/255,156, filed on 13 Nov. 2015, which is hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a laser ablation and filtration process and apparatus, wherein laser ablation and filtration is utilized to remove hydrocarbons, including oil, natural gas, grease and/or other contaminants, including pathogens, bacteria, and/or other unwanted organisms, from a liquid or fluid, e.g., fresh or salt water.

2. General Background of the Invention

Removing hydrocarbons and contaminants from water is a continuous worldwide challenge in many industries, including in the oil and natural gas industry. Conventional prior art methods require the use of chemicals and filtration media, which become exhausted and need to be continuously disposed of and replaced. The disposal of filtration materials generates additional waste and expense. Water filtration to remove contaminants such as hydrocarbons has a direct impact on oil and gas industries, the shipping industry, naval operations, and many other industries, entities, and organizations.

For example, several common standards per government regulation (including, for example, International Maritime Organization requirements MEPC.107(49)), for water from various processes is that it must have less than 15 ppm of hydrocarbons (15 microliter/liter), before dilution, before it can be discharged or disposed of back into the ocean. There are also regulations for reinjection of fluid down hole, which include the Federal Safe Water Act and UIC Regulations.

There is thus a need in the art for a method for removal of hydrocarbons that reduces or eliminates the use of chemicals and/or filtration media when removing hydrocarbons and other contaminates from water or other liquids.

There is also a need in the art to reduce or eliminate the amount of chemical and filtration waste associated with conventional prior art methods for removing hydrocarbons from a liquid, wherein chemicals and/or filtration media become exhausted and continually need to be disposed of and replaced.

There is also a need in the art to reduce the amount of expense associated with replenishing chemicals and filtration media and disposing of the chemicals and filtration media via conventional prior art methods for removing hydrocarbons from a liquid, wherein chemicals and/or filtration media become exhausted and continually need to be disposed of and replaced.

BRIEF SUMMARY OF THE INVENTION

The apparatus(es) and process(es) of the present invention solves the problems confronted in the art in a simple and straightforward manner. In various embodiments, a laser ablation and filtration apparatus and process of the present invention offers a more environmentally safe and effective alternative to purifying water containing hydrocarbons or other contaminates because it uses laser light energy, which does not require the use of consumable materials such as chemicals.

Various embodiments of the laser filtration method and apparatus of the present invention can be used to assist filtration methods that utilize chemicals and filtration media to remove hydrocarbons and other contaminates from water, wherein less chemicals and filtration media will be used.

Various embodiments of the laser filtration method and apparatus of the present invention can be used to replace conventional prior art filtration methods that utilize chemicals and filtration media to remove hydrocarbons and other contaminates from water wherein no chemicals or filtration media are needed for use with the process.

Generally, laser light is an intense, collimated and/or focused beam of visible or invisible light radiation. When exposed to laser light, hydrocarbons, including grease, natural gas and oil, and other contaminants, including pathogens or bacteria or other organisms absorb the laser light energy. The laser light energy can denature, vaporize, break down, alter, kill, or otherwise render inert the hydrocarbon or contaminate, respectively.

Different hydrocarbons and contaminates have different laser energy absorption and fluorescence characteristics. The laser energy absorption and fluorescence characteristics of a hydrocarbon or contaminate may also vary depending on the concentration of the hydrocarbon or contaminate. Laser light at one wavelength may be more effective on one type of hydrocarbon or contaminate present in a liquid, while laser light at a different wavelength may be more effective on a second type of hydrocarbon or contaminate present in the liquid.

In various embodiments the laser ablation and filtration process of the present invention comprises:

Obtaining samples of contaminated liquid that will undergo the laser ablation and filtration process;

Gathering data on absorption and fluorescence characteristics of the liquid and of the hydrocarbons present in the liquid, e.g., absorption and fluorescence characteristics that help identify the liquid and the particular type(s) of hydrocarbon or contaminants in the liquid, wherein absorption characteristics help inform the decision on which laser light wavelengths will be effective in the laser ablation and filtration process, e.g., the ability of the laser light to travel through the liquid to the targeted hydrocarbon or contaminate, to be absorbed by the liquid and to be absorbed by the targeted hydrocarbon or other contaminate;

Selecting a specific wavelength of pulsed, modulated, or continuous wave laser energy at a sufficient energy density to target one or more unwanted hydrocarbons or other contaminants;

Flowing the contaminated water into a containment vessel comprising a desired laser scanner configuration;

Applying laser energy throughout the contaminated liquid, within the containment vessel at the selected wavelength and frequency;

Preferably applying laser energy for a selected time interval and at a selected temperature;

Wherein the hydrocarbon, gas, grease and/or other targeted contaminates are vaporized, denatured, rendered inert and/or separated from the liquid, e.g., rises to the top of the liquid, where they can be separated, and flowed to a collection reservoir;

Gathering data on the amount of hydrocarbon or other contaminant remaining in the liquid after performing the above-steps;

Repeating the above-steps if necessary until only a desired amount of the hydrocarbon or other contaminants remains in the liquid, e.g. under 15 ppm (15 microliter/liter); and/or Repeating the above-steps with one or more different wavelengths to target one or more different hydrocarbons or contaminates that are present in the liquid.

In various embodiments the laser ablation and filtration process of the present invention comprises obtaining samples of contaminated liquid that will undergo the laser ablation and filtration process.

Data on absorption and fluorescence characteristics of the liquid and of the hydrocarbons present in the liquid is obtained, e.g., through running tests on the contaminated liquid. Absorption and fluorescence characteristics help identify the liquid and the particular type(s) of hydrocarbon or contaminants in the liquid. Absorption characteristics also help inform the decision on which laser light wavelengths will be effective in the laser ablation and filtration process, e.g., the ability of the laser light to travel through the liquid to the targeted hydrocarbon or contaminate, to be absorbed by the liquid and to be absorbed by the targeted hydrocarbon or other contaminate.

Selecting a specific wavelength of pulsed, modulated, or continuous wave laser energy at a sufficient energy density to target one or more unwanted hydrocarbons or other contaminant.

A sufficient energy density can be 0.5 J/cm2, for example, if targeting hydrocarbons, or 1.5 J/cm2, if targeting a pathogen.

The contaminated water can then be flowed, pulled, sucked, or otherwise drawn into a containment vessel or pipe comprising a desired laser scanner configuration.

Laser energy is applied throughout the contaminated liquid, within the containment vessel at the selected wavelength.

Preferably laser energy is applied for a selected time interval and at a selected temperature.

The selected time interval preferably is chosen to maximize absorption, vaporization, denaturalization, or the rendering inert of the contaminants in the water. The desired time interval can be optimized by testing and adjusting based on data obtained from one or more processed samples of the liquid after undergoing a laser ablation process. The longer the contaminated water is exposed to the laser energy, the cleaner the water will become.

For example, if laser energy is applied to a closed container or vessel, laser energy may be applied for 1 to 5 minutes. After the 1 to 5 minutes, the water should be visibly clearer. Also, produced gas, e.g., bubbles rising in the liquid, or other evidence of a contaminate having been separated from the liquid, can be present as visible indictors that the laser ablation process was effective to clean or purify the water. The selected time interval can be extended as necessary to achieve cleaner or maximum desired results. Optionally, the process can be repeated for 1 or 2 or 3 or 4 or 5 or 6 or 7 or 8 or 9 or 10 minute intervals, or longer as desired, for example. Testing of samples of the processed water can be performed after running each, or after one or more selected, laser ablation processes to determine if a desired result has been achieved, e.g., if the processed liquid will pass regulations for purification that will allow the water to be returned to the source.

If contaminated water is flowed through a vessel or pipe for example, the length of time the laser energy is applied will be based on the length of time it takes for the liquid to flow through the vessel or pipe with exposure to the laser path. In this embodiment, using mirrors to bounce the laser energy around the vessel or pipe, or adjusting the configuration of the laser beam, e.g., so that it is a cone or tube configuration, can be desirable to maximize exposure of the liquid to the laser energy while the contaminated liquid is traveling through the vessel or pipe, for example.

The selected temperature can be room temperature. The temperature of the liquid is not as important as other parameters and can vary and still be effective at a wide range of temperatures.

Preferably during the laser ablation process, the hydrocarbon, gas, grease and/or other targeted contaminates are vaporized, denatured, rendered inert and/or separated from the liquid, e.g., rises to the top of the liquid to be separated and flow to a collection reservoir.

Data preferably is gathered on the amount of hydrocarbon remaining in the liquid after performing the above-steps.

The above-steps can be repeated if necessary until only a desired amount of the hydrocarbon remains in the liquid, e.g. under 15 ppm (15 microliter/liter).

The laser ablation process can also be repeated with one or more different wavelengths to target one or more different hydrocarbons or contaminates that are present in the liquid.

In various embodiments, after purifying the liquid, the liquid may be flowed to a reservoir, the ocean, downhole, or otherwise returned to a source for the water.

In various embodiments, a specific wavelength of pulsed, modulated, or continuous wave laser energy at a sufficient energy density is used to target unwanted contaminants, such as hydrocarbons from crude oil, in water, or other liquids, and used to decrease and/or completely remove their concentration from the liquid.

Pulse duration of a wavelength can be at 10 nanoseconds, or 100 nanoseconds, for example, or it can be Continuous Wave (CW) or modulated wave. Preferably the pulse duration and type of pulse parameter is selected so that the laser energy reaches an effective energy density of light that causes the reaction with the contaminate in the liquid. As indicated pulse duration can be set at 10 or 100 nanoseconds. A continuous wave or CW is a continuous laser beam without pulses that is very intense. A modulated CW wave is also a continuous laser beam with high and low peaks of energy.

An energy density will be sufficient if it facilitates the desired reaction or process to denature the targeted contaminants. A desired energy density can be determined by testing one or more samples of processed liquid, after it has undergone a laser ablation process, and then adjusting the energy density to help achieve more effective results. The process can be repeated for a particular liquid to undergo the ablation process, until optimal parameters are identified for the particular contaminated liquid.

The above-described testing process can also be conducted to determine other optimal parameters for the laser ablation process for a particular contaminated liquid.

Various embodiments of the apparatus and process of the present invention will use absorption characteristics and/or fluorescence of the contaminant material, and will use tuned high power lasers to vaporize, denature, and/or separate the contaminants from water. Examples of high power lasers include laser sources, such as pulsed, continuous wave, or modulated continuous wave lasers that typically emit ten watts or more of average power, up to multiple kilowatts or megawatts.

For example, 70 W and 100 W units have been tested and more powerful laser sources foreseeably will increase efficacy of the process. Repeated testing with high frequency 1064 nm laser pulses, e.g., 200,000 to 1,000,000 pulses per second, has established that hydrocarbon levels in water are successfully reduced every time. Preliminary testing with low frequency 532 nm laser pulses, e.g., 10 pulses per second, has effectually produced clearer water, visually, and appears to successfully vaporize hydrocarbon contaminants. It is foreseen that testing with high frequency, e.g., 200,000 to 1,000,000 million pulses per second, of 532 nm laser sources will provide even better production rates and measurements. It is foreseen that testing with low or high frequency, e.g., 10 to 1,000,000 million pulses per second, of 532 nm laser energy will effectively process and clean contaminated liquid.

In various embodiments tuning parameters may include, but are not limited to, wavelength, fluence, pulse duration, modulation rate, pulse profile, beam diameter, pulse frequency, energy, and/or focal distance.

In various embodiments the laser light energy can be fired directly into the liquid from a source or with the assistance of a delivery system such as mirrors, fiber optics, articulated arms, and laser scanners. The necessary energy density or fluence of the laser that is needed to facilitate the reaction can be achieved by firing the laser directly from a source or by using optics such as collimators, mirrors, prisms, custom optics, and focusing lenses to achieve desired parameters.

In various embodiments, the laser energy is absorbed by the contaminant and can convert a part or all of the contaminant from a liquid state into a gaseous state, allowing it to float to the surface and separate from the liquid. The laser energy can also disrupt bonds and/or denature or decompose the contaminant. For example, molecular bonds can be broken, resulting in both chemical and/or physical changes of the material. This process may render hazardous materials to chemically and/or physically change to be inert. Laser pulses result in photomechanical, photochemical, and photothermal processes that act upon and affect the hydrocarbon and/or other contaminant.

In various embodiments, the path and intensity of the laser may be absorbed into the liquid over a long distance of travel and/or terminate at a target or surface. A target can be simply an inert energy dump material or can be made of a material that will facilitate plasma formation and cavitation bubbles. An inert energy dump material may be selected based on the wavelengths to be utilized in the laser ablation apparatus and/or process wherein the energy dump will sufficiently absorb the laser energy and terminate or end the laser path. An energy dump can be made of a material such as metal or ceramic that is appropriate for the wavelength or wavelengths being used. A metal commonly used in energy dumps is aluminum. Titanium is an example of another metal that may be used as an energy dump. Other suitable metals may also be utilized based on capability to absorb the wavelengths to be used.

A target could also be an energy dump that is a chamber containing a liquid or fluid or other material that strongly, or will sufficiently, absorb the laser wavelength or wavelengths used in the process or apparatus.

Ceramic, titanium and aluminum are examples of materials that may be used as an energy dump and which facilitate formation of cavitation bubbles, e.g., for use with 1064 nm, 532 nm, 355 nm, and/or 266 nm wavelengths. Other examples of inert energy dumps include graphite and glass, e.g., for use with 1064 nm, 532 nm, 355 nm, and/or 266 nm wavelengths. Bubbles can also form in the liquid itself without need of hitting a solid surface.

The laser energy can also be used to create bubbles and micro-bubbles or cavitation bubbles which help facilitate the separation of the contaminant from the liquid. These cavitation bubbles can help carry the contaminant material to the surface for flowing to a collection reservoir. The bubbles may assist in contaminant removal by facilitating the formation of a hydrophobic and/or hydrophilic film around each bubble that is carried up to the surface. The contaminant may also develop an electrostatic or other attraction to the bubbles that are formed and/or to itself.

Laser energy can also be used to break down and denature contaminants. A specific wavelength is preferably selected to target a contaminant in the water.

In various embodiments, the laser ablation process may also break down the contaminant into small particles such as microparticles or nanoparticles.

In various embodiments, the laser ablation process may also produce micro-bubbles, which aid in separating the hydrocarbon or contaminant from the liquid.

A key principle with this technology is choosing a wavelength, or multiple wavelengths, that penetrates through the liquid, such as water, and absorbs into the contaminant. If the wavelength cannot pass through the liquid, then it will not reach the contaminant. In various embodiments, a wavelength with some absorption into the liquid may be desirable as it will still reach the contaminant, will weaken and dissipate after a certain distance, and will cause additional reactions such as heating up the liquid, which may be beneficial to the process in various embodiments. Heating the liquid with the laser or with other methods is foreseen to be beneficial as there is an inverse relationship between temperature and the solubility of gas in water. A higher temperature of the liquid foreseeably will help the reaction go faster.

In various embodiments, one or more wavelengths can be used individually or simultaneously, e.g., 532 nm and 1064 nm used simultaneously or individually.

In various embodiments, the laser ablation process may operate efficiently on its own to purify liquid and remove unwanted hydrocarbons and contaminants, without use of an additive or other conventional filtration methods.

In various embodiments, the laser ablation process is used in conjunction with additives, e.g., adding emulsifiers or surfactants, that at a Critical Micelle Concentration level help isolate and remove the contaminant from the liquid.

In various embodiments, the laser ablation process is used in conjunction with chemicals and/or filtration medium to assist in separating or removing hydrocarbons and other contaminates from the liquid.

In various embodiments, the laser ablation process is used in conjunction with additives and other chemicals and filtration medium to assist in separating or removing hydrocarbons and other contaminates from the liquid.

In various embodiments, the apparatus of the present invention comprises a containment vessel. The containment vessel is for containing liquid to be purified. The containment vessel may comprise a laser source, e.g. a laser scanner, for providing and directing laser light energy into and through the liquid to be purified. The containment vessel can contain the contaminated liquid to be purified and the laser energy during the treatment process. In some embodiments, contaminated water can flow through a vessel, e.g., continuously flow through vessel, during the laser ablation process, and exit the vessel when it reaches the end of the vessel as processed or purified or clean water.

The position of a laser source, e.g. a laser scanner within or outside of a vessel, e.g., a containment vessel, is important to the laser removal process. Preferably the laser is positioned within or outside the vessel so as to maximize exposure of the liquid to the laser energy. The position of the scanner affects the path of the laser energy. To provide this controlled containment, preferably certain sizing parameters are applied including angle and inclination of the laser, retention time for the laser process to be applied and geometry of the containment for proper inclination, preferably to achieve maximum exposure of the liquid to the laser energy. After evaluating the contaminated liquid and applying selected parameters, and re-testing the water, the parameters can be adjusted based on the type and amount of contaminants still present in the liquid, to help achieve maximum exposure and effective removal of contaminants for the laser ablation process.

Additionally certain mechanical devices may be included to assist in removal of the oil, grease, gas or other contaminate and for removal of byproduct created by the laser, i.e. residual oil.

Preferably compartmental containment is provided as a vital feature for separation and removal.

In addition to residual oil, micro-bubbles may be produced as a byproduct of the laser process. Due to their size and physical characteristics, sub 50 micron by definition, the containment and compartmentalization process becomes more important and crucial to the management of the process. Compartmentalization and sizing of the compartments based on flow and flow characteristics will add to the success of the overall process of laser ablation and micro-bubbles.

In addition to the laser ablation process and any micro bubbles that may be formed, additional micro bubbles can be added to the system to better facilitate filtration and separation of materials. These bubbles can be created by mechanical means, which include mechanical agitation, eductor, and dissolved air pump.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 1-1A illustrate an example of absorption and fluorescence spectra data of hydrocarbons in contaminated water, as obtained in an embodiment of the process of the present invention;

FIGS. 4-4A illustrate a view of contaminated water (on the left) and the same water after applying a laser ablation and filtration process of the present invention (on the right) and the absorption spectra of the contaminated and cleaned water;

FIG. 5 illustrates a laser scanner positioned near a corner junction of pipes, firing parallel to the flow direction in an embodiment of the method of the present invention;

FIG. 6 illustrates a top view of a laser scanner above a pipe, firing perpendicular to the flow direction;

FIGS. 6A-6C illustrate side views of a laser scanner above a pipe, firing perpendicular to the flow direction;

FIG. 9 illustrates a laser path in a vessel, chamber, tube, or pipe having liquid therein wherein the laser light "wall" bounces around in the vessel, chamber, tube, or pipe increasing the amount of exposure of the liquid to the laser as the liquid flows therethrough in an embodiment of the method and apparatus of the present invention;

DETAILED DESCRIPTION OF THE INVENTION

The apparatus and process of the present invention offers a more environmentally safe and effective alternative to purifying water containing hydrocarbons because it uses laser light energy, which does not require the use of consumable materials such as chemicals. Embodiments of the laser ablation and filtration method and apparatus of the present invention can be used to assist and/or replace current filtration methods.

Figure 1A:
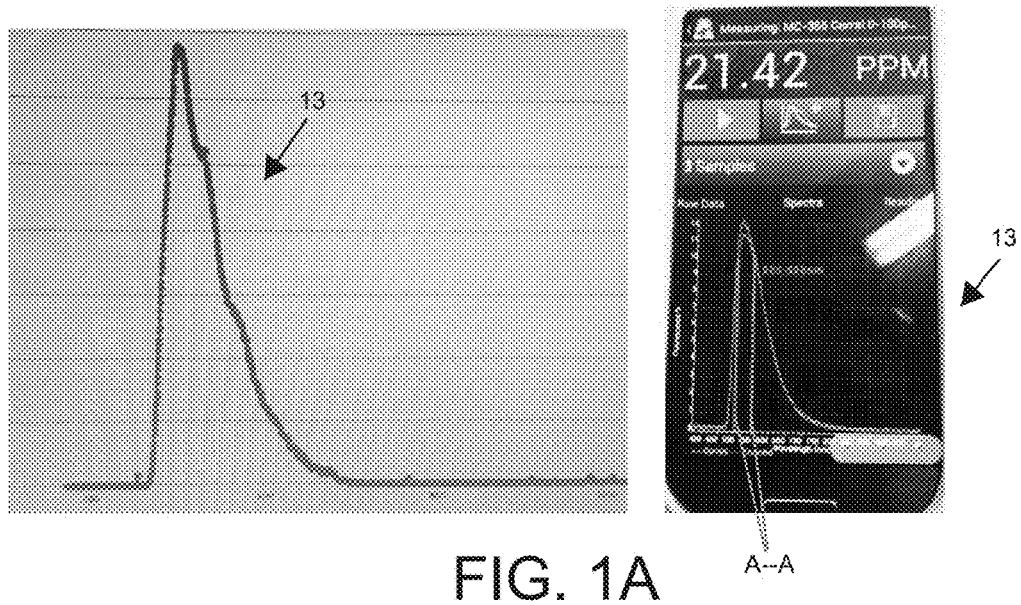
Figure 2A:
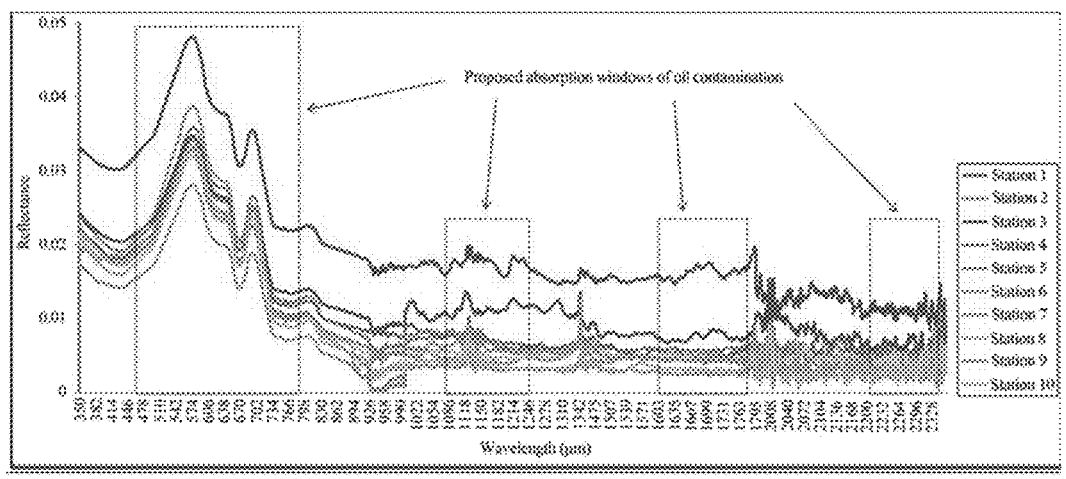
FIGS. 2-2A illustrate a prior art graph depicting absorption spectra of oil.
Figure 2:
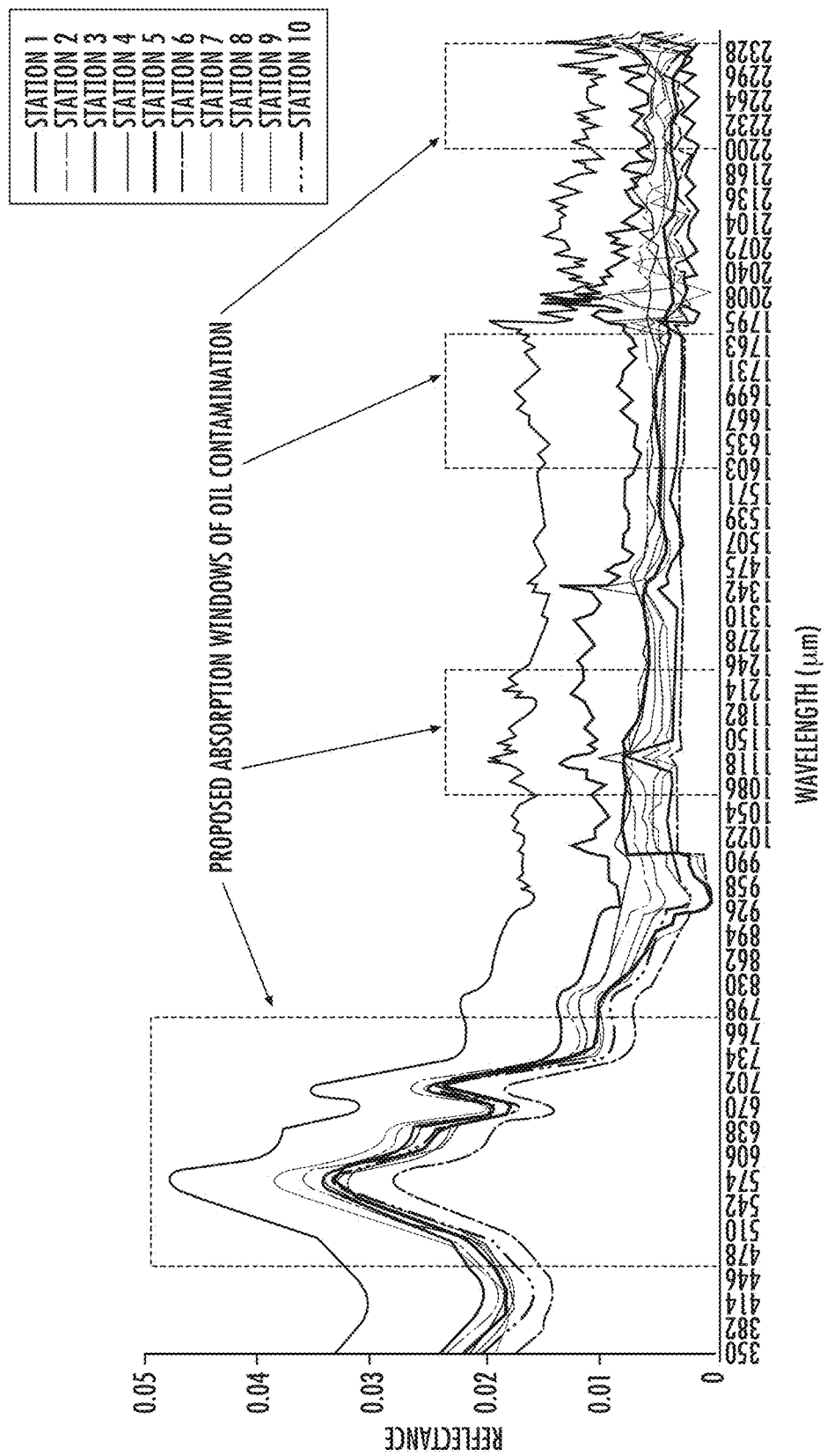
Figure 3:
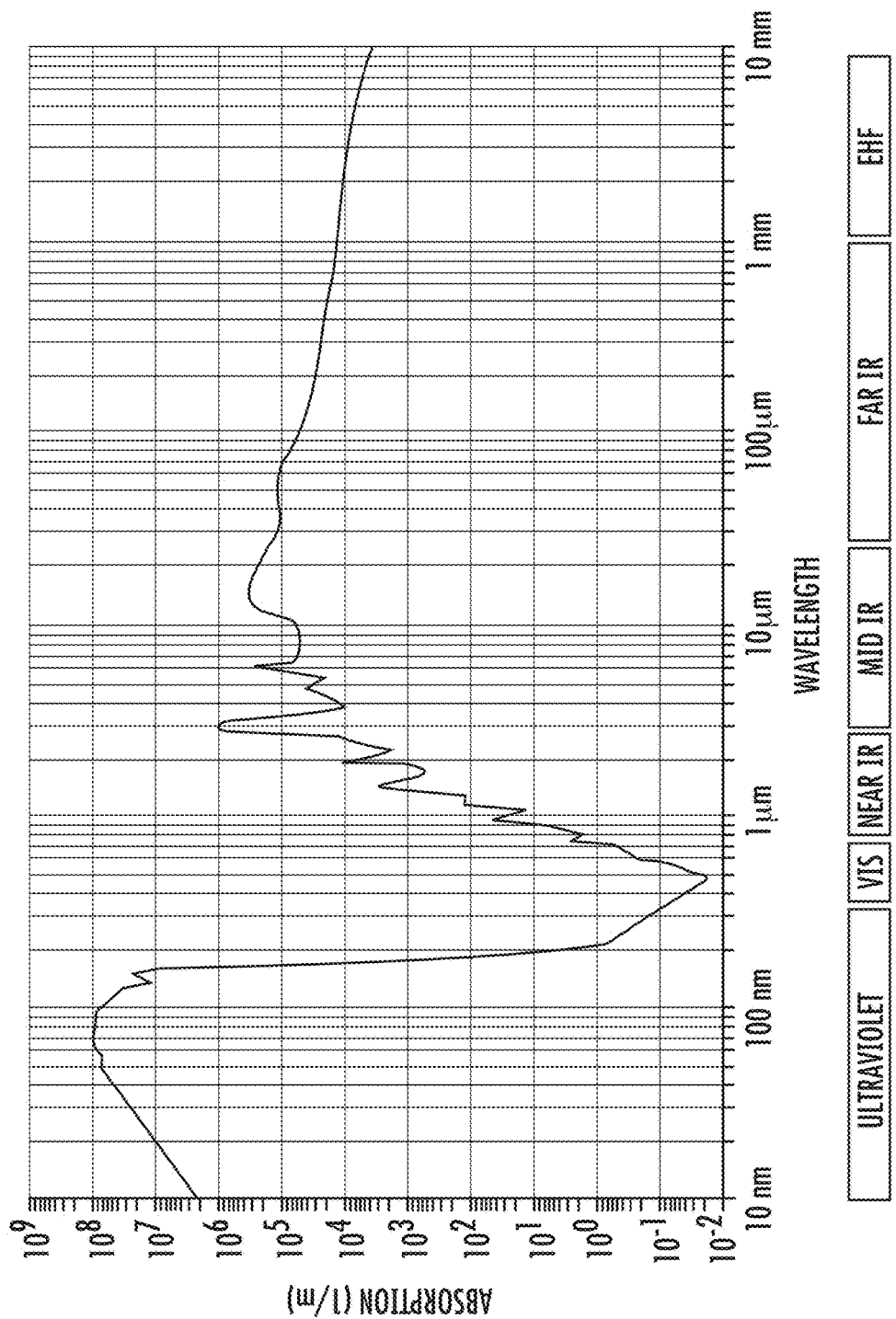
FIGS. 3-3A illustrate a prior art graph depicting absorption spectrum of liquid water across a wide wavelength range.

Before turning to FIGS. 1 and 4-13, which illustrate examples of various embodiments of the method and apparatus of the present invention, reference is made to FIGS. 2-3.

FIGS. 2-2A illustrate a chart showing absorption spectra of oil, from Open Journal of Marine Science: Detecting Oil Spill Contamination Using Airborne Hyperspectral Data in the River Nile, Egypt (available at: http://file.scirp.org/Html/htmlimages/9-1470129x/297a010a-dc5f-4305-adf9-a7cd430 31658.png), which is hereby incorporated herein by reference. As discussed in detecting Oil Spill Contamination Using Airborne Hyperspectral Data in the River Nile, Egypt, the interaction between the oil slick and the optical electromagnetic radiation is governed by the light transmission and reflection through the oil slick. Four recognizable windows of absorption of electromagnetic radiation with oil contamination, are 1) visible range from 400-800 μm; 2) near infrared range from 1100 μm to 1220 μm; 3) near infrared range from 1600 μm to 1760 μm; and 4) short wave infrared range from 2200 μm to 2350 μm [12]-[14]. FIG. 2 shows the spectral response of the in-situ sampling sites in the Nile River in correlation with the predefined four absorption windows.

Figure 3A:
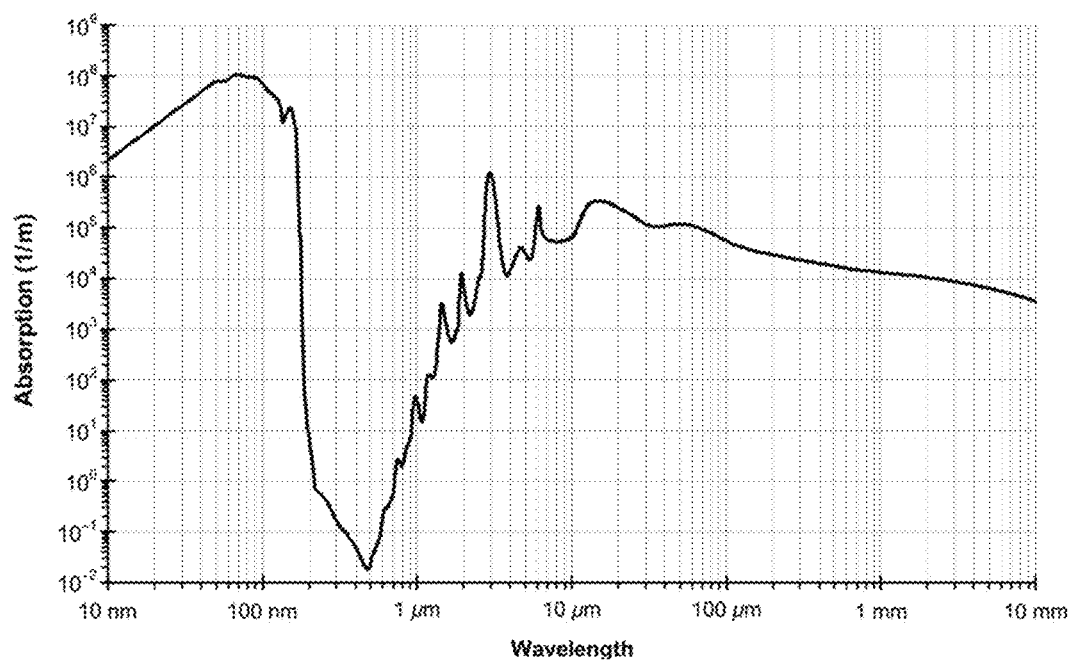

FIGS. 3-3A illustrate a chart showing absorption spectrum of liquid water across a wide wavelength range. Strong Bands: 2900 nm, 1950 nm, 1450 nm. Medium bands: 1200 nm, 900 nm. Weak bands: 820 nm, 730 nm. The hydroxide (OH) bonds of water, for example have a strong absorption near 3,000 nm or 3 microns. (The chart shown is available at: http://omlc.org/spectra/water/abs/index.html (which is hereby incorporated herein by reference)).

Turning now to FIGS. 4-13, the laser ablation apparatus 10 of the present invention comprises a vessel 11 (see FIGS. 5-6, 8-9). A vessel 11, which may be a containment vessel or other container or a pipe or tube, contains or houses a liquid 20 to be processed and/or purified during the laser ablation and filtration process, wherein the contaminated liquid 20 may be flowed therethrough, or contained within a vessel 11 while undergoing laser ablation. The laser ablation apparatus 10 has a laser source or scanner 40 for providing and directing laser light energy 12 to the liquid 20 to be purified. In various embodiments, the vessel 11 contains the contaminated liquid 20 that will undergo the ablation and filtration process and the laser energy 12 during the treatment process. The process may utilize a wide range of wavelengths from the electromagnetic spectrum such as, but not limited to UV light, wavelengths from the visible color spectrum such as green and blue lasers, infrared lasers, as well as others. For example, 1064 nm, 532 nm, 355 nm, and/or 266 nm lasers can be used individually or simultaneously for optimal effects. For example, 1064 nm, 532 nm, 355 nm, and/or 266 nm laser radiation can be obtained from a Nd:YAG laser.

The laser 40 may be positioned within or outside a vessel 11. A vessel 11 may be a containment vessel or container manufactured for the laser ablation and filtration process. A vessel 11 may also be an existing or prior art vessel or container adapted for use with the laser filtration process. Alternatively, the vessel 11 may be a pipe or tube in the field, for example, and the process may be applied within a pipe or tube in the field. The process may be applied directly to a vessel/pipe/tube 11 in the field via inserting a laser source 40 into the vessel/pipe/tube 11 or adding a laser source 40 attachment to the vessel/pipe/tube pipe 11.

If a laser 40 is positioned outside a vessel 11, a window 90 preferably is provided on the vessel 11, which will allow the laser energy 12 to travel through the window 90 and within the vessel 11 to the liquid 20 housed within (see FIG. 8).

The position of a laser source 40 within or outside a vessel 11 is important to the laser removal process. Preferably the laser 40 is positioned so as to maximize exposure of the liquid 20 and contaminates to be removed by the laser energy. The position of the scanner affects the path 15 of the laser energy 12. To provide a desired controlled containment and laser ablation and filtration process, certain sizing parameters are preferably applied including angle and inclination of the laser source 40, retention time for the laser process to be applied and based on geometry of the containment or vessel 11 for proper inclination.

In various embodiments one or more mirrors 80 may be utilized to affect the path 15 of the laser energy 12 wherein laser energy 12 will bounce off the one or more mirrors 80.

Additionally certain mechanical devices can be included for removal of oil, grease, gas or other contaminates and for removal of one or more by-products created by the laser process, i.e. residual oil or microbubbles.

Preferably compartmental containment is provided as a vital feature for separation and removal of unwanted contaminates. In addition to residual oil, micro-bubbles may be produced as a byproduct of the laser process. Due to their size and physical characteristics, sub 50 micron by definition, the containment and compartmentalization process becomes more important and crucial to the management of the process. Compartmentalization and sizing of the compartments based on flow and flow characteristics will add to the success of the overall process of laser ablation and micro-bubbles.

A vessel or container 11 may comprise a collection chamber, or a series of chambers. In various embodiments, the chambers may have perforated membranes, which allow clean water to pass therethrough but captures separated contaminates.

In various embodiments a ventilation system may be integrated to collect and separate gasses that are created in the ablation process. Preferably a gas collection area or mechanism will be physically, and/or optically separated from the path 15 of the laser beam 12 in order to avoid any risk of potentially igniting flammable gasses or materials.

Turning now to the laser ablation process, in various embodiments the laser ablation process preferably comprises obtaining one or more samples of contaminated water or liquid that will undergo the laser ablation process. Absorption, fluorescence, and microscopy, of the one or more samples are preferably evaluated. Absorption, fluorescence and microscopy information, characteristics and/or data can be evaluated and recorded by using absorption spectroscopy such as ultraviolet-visible spectroscopy. For example, a spectrometer such as a SILVER-Nova, that is commercially available at http://www.stellarnet.us, can be used.

Absorption and fluorescence characteristics, information and data help with identifying the type of liquid or fluid, the type of hydrocarbon(s) within the fluid and also other types of contaminates that may be present. Video microscopy can help with identifying physical changes of the oil droplets, solid particles, and gas bubbles. The data may be collected by spectroscopic instruments, video microscopy instruments, gravimetric testing, and/or with other suitable analytical tools, currently existing or which may be developed in the future. Absorption characteristics also help inform the decision on which wavelengths are selected for the laser based on the wavelength's ability to travel through the particular liquid, the capability of being absorbed by the liquid and capability of being absorbed by the hydrocarbon or other targeted contaminate.

After evaluating absorption, fluorescence and microscopy characteristics and/or other collected data for the purpose of determining the liquid composition and contaminants present therein, the process includes selecting a specific or desired wavelength of pulsed, modulated, or continuous wave laser energy at a sufficient energy density to target a particular, or more than one, unwanted hydrocarbon or other contaminant, based on the absorption characteristics of the hydrocarbons, contaminates and the liquid.

Next, contaminated water will be flowed, pulled or otherwise into the containment vessel. A desired laser source and configuration will be selected. Laser energy can then be supplied throughout the contaminated liquid, within the containment vessel, at the selected wavelength. A selected time interval and temperature may also be utilized. The laser energy will travel through the liquid and be absorbed by the hydrocarbon, gas, grease and/or other targeted contaminate for vaporizing, denaturing, rendering inert, killing and/or separating from the liquid, e.g., rising to the top of the liquid wherein it may flow to a collection reservoir or chamber.

Examples of laser scanner configurations will be discussed further below with reference to FIGS. 5-9.

In various embodiments, separated hydrocarbon, gas, grease, and/or other targeted contaminates are disposed of after removal, e.g. flowed to a collection chamber or reservoir or sump 16.

Figure 10:
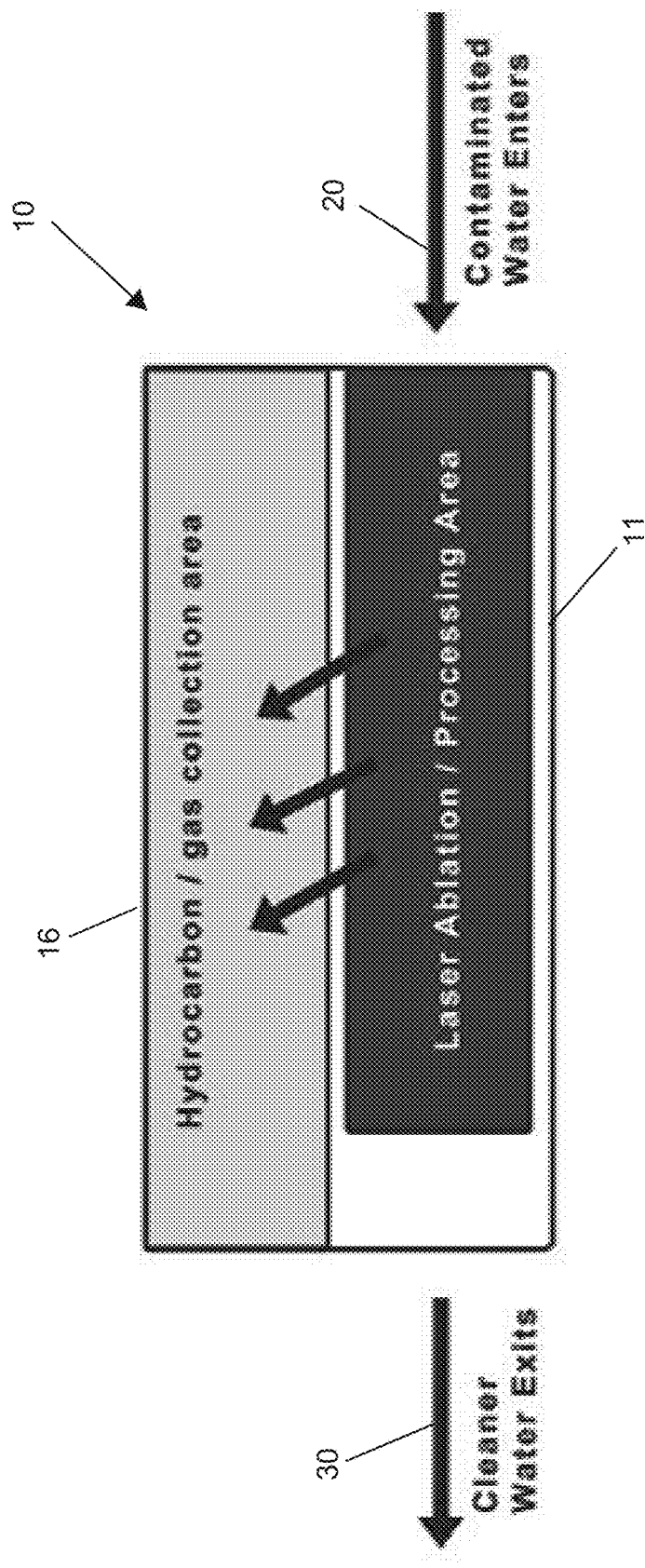
FIG. 10 is a schematic diagram of an embodiment of the process of the present invention wherein contaminated liquid flows into a container to undergo a laser ablation process, wherein separated or transformed hydrocarbons are separated from the contaminated liquid and flowed to a collection chamber, and wherein clean water exits the container or pipe.

A vessel 11 may be configured so that separated or transformed hydrocarbons or contaminates flow to the top of the liquid, wherein the separated or transformed hydrocarbons can be separated from the liquid through gravity separation, for example, and then flowed to a collection chamber or reservoir or sump 16. To remove separated contaminates, skimmer devices such as spillover weirs, rotatable paddles, or flight and rake systems, may be used to assist with removal and flow of separated materials to a collection chamber or collections sump 16. FIG. 10 is a schematic diagram illustrating an embodiment of the method, wherein contaminated water 20 flows into vessel 11. Separated or transformed hydrocarbons or contaminates can flow to the top of the liquid and to a collection chamber 16. Prior to flowing to a collection chamber they could also be flowed through skimmer devices such as spillover weirs, rotatable paddles, or flight and rake systems. Processed water exits vessel 11 after the laser ablation process is complete.

A collection chamber or series of chambers, perforated membranes, or a ventilation system preferably will be integrated to collect and separate the gasses that are created in the ablation process. Preferably this gas collection area or mechanism is physically and/or optically separated from the path of the laser beam in order to avoid any risk of potentially igniting flammable gasses.

Additional reference is made to U.S. Pat. Nos. 8,834,723; 8,834,724; 9,095,786; and to U.S. Patent Application Publication No. US20160009571A1, each of which is hereby incorporated herein by reference, which are directed to apparatuses and methods for separation and removal of hydrocarbons or other contaminates from a liquid.

After laser energy is applied under selected parameters and for a selected time interval, data may be gathered and collected on the one or more samples of the processed or purified liquid, including on the amount of hydrocarbon or contaminants remaining in the liquid, as well as the type of hydrocarbon or contaminants that remain in the liquid. If necessary, the process may be repeated until only a desired minimum amount of the hydrocarbon or contaminate remains in the liquid, e.g. under 15 ppm (15 microliter/liter) hydrocarbon. The same liquid may also undergo the laser ablation and filtration process again wherein one or more different selected wavelengths are utilized to target one or more different hydrocarbons or contaminates that may be present in the liquid.

In various embodiments, after purifying the liquid, the liquid may be returned to a reservoir, or to the source of the liquid or used downhole.

In various embodiments, more than one laser source or scanner, e.g. two, three, four, five or more, may be used, each laser source or scanner tuned to the same parameters, to increase exposure of the liquid to the laser beam by having multiple laser paths directed through the liquid at the same time.

In various embodiments, more than one laser source or scanner, e.g. two, three, four, five or more, may be used, each laser source or scanner tuned to one or more different parameters, e.g., one or more different wavelengths, to send laser beams at different wavelengths and/or different parameters through the liquid at the same time.

Turning now to FIG. 1, an example will be discussed. FIG. 1 illustrates absorption and fluorescence data 13 gathered while performing the laser ablation process on a sample of contaminated water. The absorption and fluorescence spectra of hydrocarbons is shown. The lines designated by A-A highlight the 500-550 nm peak.

Example

The following example is illustrative and is not exhaustive. Hydrocarbons present in a liquid are measured via an ASD spectroradiomete, to absorb around 400-800 nm, with a peak fluorescence around 500-550 nm (see FIGS. 1-1A and FIGS. 2-2A). Laser radiation can be used to target the entire hydrocarbon that is known to fluoresce at these wavelengths. For example a 532 nm laser radiation is an effective wavelength because this particular wavelength passes through both fresh and salt water fairly well (FIG. 3) and is also strongly absorbed by hydrocarbons. Other wavelengths, selected based on their absorption characteristics into a particular contaminant, and the fluid can also be used. For example, wavelengths may be selected that will penetrate the liquid and will be absorbed by the hydrocarbon and cause vaporization, denaturing or separation of the hydrocarbon from the fluid. Also, in various embodiments a wavelength will be selected so the liquid absorbs some of the laser light energy while the laser light energy is passing through the liquid.

UV laser radiation can also be used to neutralize pathogens, bacteria, and other unwanted organisms in water.

The laser ablation and filtration apparatus and process offers a more environmentally safe and effective alternative to purifying water because it uses laser light energy, which does not require the use of consumable materials such as chemicals. Laser ablation filtration methods can be used to assist and/or replace prior art or current filtration methods.

In various embodiments, laser filtration methods can be used to assist and/or replace current filtration methods.

Experimental Study

Figure 4A:
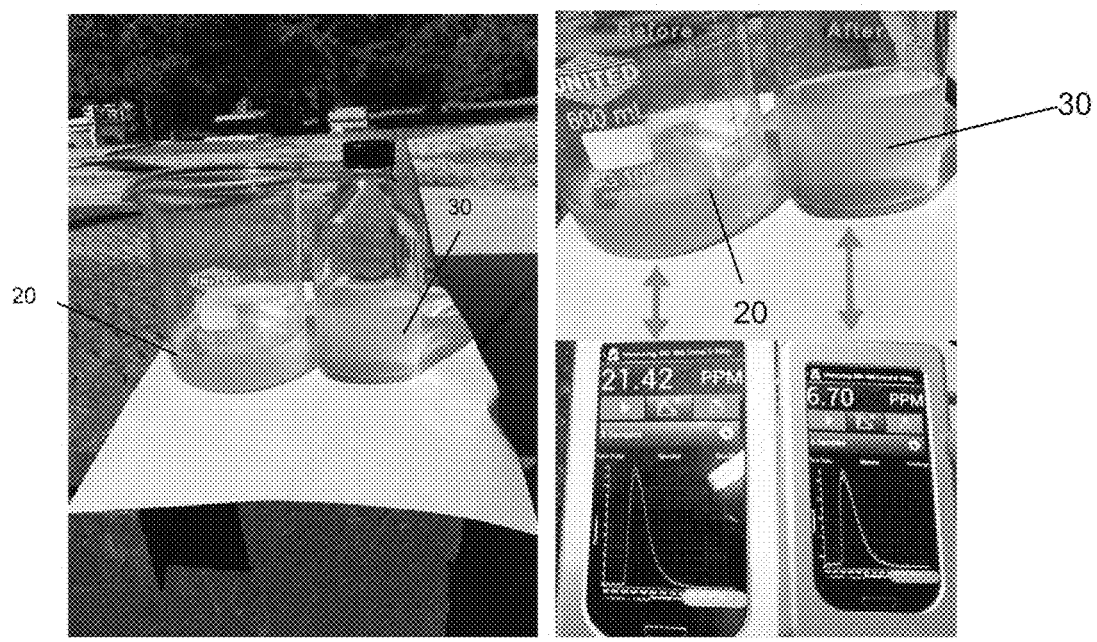
Figure 7A:
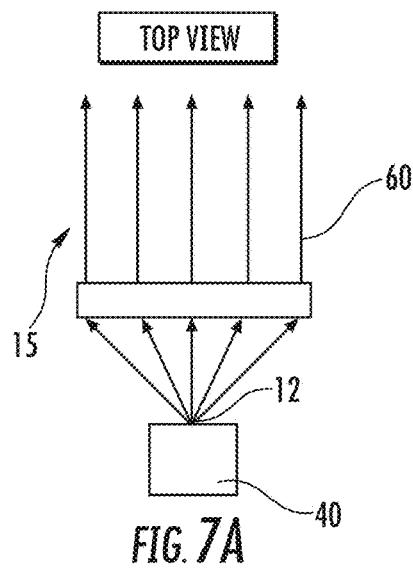
FIGS. 7A-7E illustrates examples of laser source or scanner configurations in various embodiments of the method of the present invention.
Figure 7B:
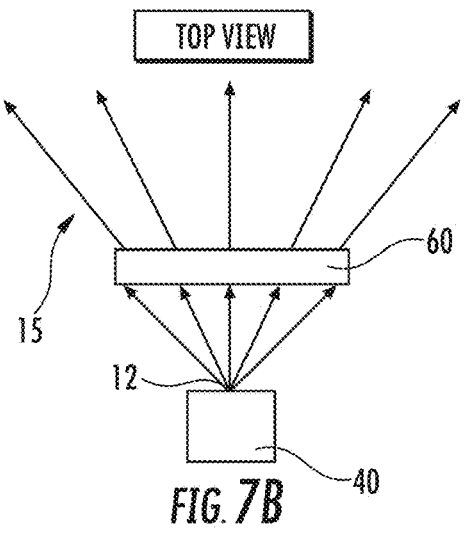
Figure 7C:
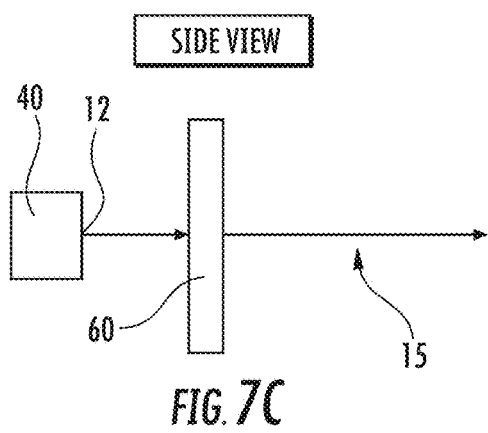
Figure 7D:
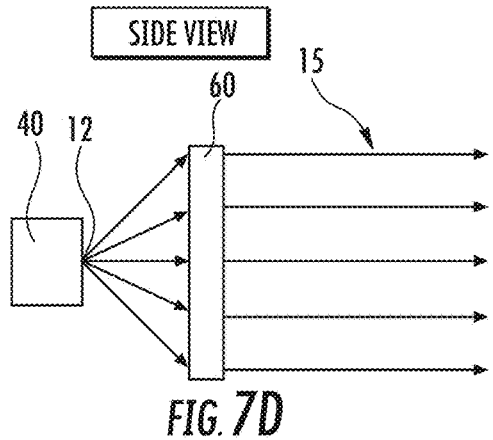
Figure 7E:
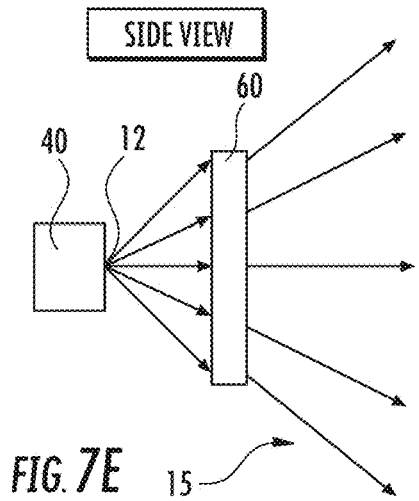

FIGS. 4-4A illustrate before and after results for water 20 processed and/or purified with a laser ablation process. FIG. 4A is a photograph view illustrating a sample of contaminated water 20, and then a sample of processed water 30. Contaminated water 20 had hydrocarbon levels measuring at 21.42 ppm. After going through a laser ablation and filtration process the processed water 30 had hydrocarbon levels measuring at 6.70 ppm. During the experimental study, 1064 nm 100 ns laser pulses in a prototype system were used to successfully reduce the concentration of a Gulf of Mexico offshore location for a Major Oil Company oil dispersion in water, at room temperature, by 75% by vaporizing the oil that was emulsified in the water. As shown in FIG. 4A, the water turned visibly clearer after exposure to the laser pulses, a gas was generated, and the measured parts per million of the hydrocarbon content decreased by 75%.

In various embodiments one or more different selected wavelengths may be used individually or at the same time to achieve optimal results while purifying water and to target one or more different kinds of contaminates at the same time.

In various embodiments a wavelength between 266 nm and 1064 nm may be utilized to purify water containing hydrocarbons. In other embodiments a wide range of wavelengths from the electromagnetic spectrum can be utilized to target varying hydrocarbons or other contaminates based on the particular wavelengths effect on the contaminants or hydrocarbons.

In various embodiments multiple different wavelengths may be utilized to process and/or clean water containing a plurality of different types of hydrocarbons or other contaminants, the wavelengths selected based on absorption and/or florescence and/or microscopy characteristics or data of the liquid and particular hydrocarbons at issue so that the laser energy will be able to travel through the liquid, reach the hydrocarbon or other contaminate, and vaporize, denature, separate or otherwise render inert the hydrocarbon or other contaminate.

It is foreseen that laser radiation at 532 nm, e.g. high frequency 532 nm, will be even more effective at exciting and removing hydrocarbons than a 1064 nm wavelength, from water based on the known absorption characteristics of water and hydrocarbons.

In various embodiments a combination of more than one wavelength, used simultaneously, is foreseen to provide optimal results. When using multiple wavelengths, multiple hydrocarbons and contaminants having different absorption characteristics may be targeted at one time. For example wavelengths such as, but not limited to, 1064 nm and 532 nm and 355 nm and 266 nm can be used at the same time to achieve optimal desired results while purifying water.

In various embodiments, one or more wavelengths, for example wavelengths such as, but not limited to, 1064 nm and 532 nm and 355 nm and or 266 nm can be used individually, in sequence when processing the liquid more than one time, to achieve optimal desired results while purifying or cleaning the liquid.

In various embodiments the same wavelength, e.g. 1064 nm and 532 nm and 355 nm and or 266 nm, can be used in sequence when processing the liquid more than one time to achieve optimal desired results while purifying or cleaning the liquid.

In various embodiments wavelengths of 1064 nm and 532 nm are preferably selected for targeting hydrocarbons in water, including fresh or salt water, and the 1064 nm or 532 nm wavelengths may each be utilized alone, and/or together, and/or in sequence in a laser ablation process. 532 nm and 1064 nm are related harmonically as 532 nm is the second harmonic of 1064 nm laser light. 1064 divided by 2=532.

In various embodiments, the laser ablation process may be used in a mobile device or incorporated into a floating or submerged vessel (e.g., a motorized vessel) or incorporated into an apparatus that can filter water around it or process water that passes through it as it floats or moves. Such a vessel system could be placed inside of a water holding tank and purify the water or it could be, for example, released into the ocean to deal with an oil spill. Instead of the water flowing through a stationary system, the system may be mobile and move through the water and process the water while the vessel moves through the water. For example, a self-contained vessel may comprise a laser filter, wherein the vessel can suck or gather or flow water into it as it moves, or while it is stationary, and process the water. In various embodiments the self-contained floating or moveable vessel can also be equipped with sensors, e.g., an EX-100 sensor, commercially available at http://www.advancedsensors.co.uk, that measures parts per million (ppm) of oil or other contaminates present in water. The vessel may be configured to activate once a designated level of hydrocarbons or contaminates is reached. Activation could be automatically set to occur when a certain level of hydro-carbon or contaminate is measured. Alternatively, activation could occur, manually or remotely, or via other suitable means when a hydro-carbons or other contaminates measure at a specified level.

FIG. 5 illustrates an arrangement wherein a laser scanner 40 is positioned at or near a corner of a vessel 11, for example a corner junction of a pipe system or containment vessel 11. As shown, a laser scanner 40 is at corner of pipes or vessel 11, firing parallel to the flow direction. A laser path 15 is illustrated. Such a configuration includes incorporation of a laser scanning system 40, such as, but not limited to, those manufactured by G.C. Laser Systems Inc. for the GC-1 laser system. Additional scanning systems 40 can also be used in which the laser energy of beam 12 exits the system 40 as a cone to trace out a closed curve of a circle or oval. The laser energy 12 cone can be fired down the length of the pipe or containment vessel 11 until it terminates on the walls. All water or liquid 20 passing through the pipe 11 must pass through the laser 12 cone as it flows through the pipe 11. The pipe 11 can for example be round or square or rectangle, or other desired shape.

FIGS. 6-6C illustrate an arrangement wherein a laser scanner 40 is positioned above a pipe or vessel 11, firing perpendicular to the flow direction. Such a configuration utilizes a scanning system 40 in which the laser beam 12 exits the system 40 as a cone to trace out a closed curve of a circle or oval. The top view and side views show that as liquid 20 passes past the laser beam 12 circular scan, it is exposed to the laser beam 12 twice: 1 & 2. The first exposure is as the liquid 20 enters the circle, and the second exposure is as the liquid 20 exits the circle.

The liquid material 20 is processed twice as efficiently in such a configuration with a laser beam 12 circular scan as with a linear scan method, by comparison, because the liquid 20 gets double the exposure. A laser beam 12 linear scan, running a line perpendicular to the direction of the flow, in such a configuration allows the material to react with the laser beam 12 once as the liquid 20 passes.

The side views in FIGS. 6A-6C show different configurations of how the laser beam 12 cone can be shaped to interact with the material: A: direct shot from scanner into liquid 20 at an angle, e.g., preferably a 5 to 45 degree angle (see FIG. 6A). B: Scanner 40 interacts with and optic 60 such as a telecentric f-theta lens that creates a more perpendicular tube out of the incoming cone (see FIG. 6B). C: laser 12 Cone is fired into a focusing lens 70 such as a regular lens or f-theta lens to create more intense focus in a particular focal plane or zone (see FIG. 6C).

In various embodiments a laser beam can be directed into a chamber at an angle other than 90 degrees.

This type of design can be executed by having a window 90 composed of a material which transmits the laser radiation on the pipe or containment vessel to allow the laser beam to enter the pipe. Fused silica is an example of such a material for a window. The pipe or containment vessel 11 can be square or round or any other desired shape. A square shape, in cross section, pipe or container 11 is preferred as allowing a more efficient exposure of the liquid 20 to a laser beam 12. One face of a square pipe 11 would preferably feature a fused silica, or other suitable material, window 90 to allow the laser beam 12 to enter.

FIGS. 7A-7E illustrate examples of some possible laser scanner 40 configurations. The laser source or scanner 40 can be designed, for example, with different optics to create a laser beam 12 having a 2 dimensional flat plane (A+C) (see FIGS. 7A-7C), a three dimensional tube (A+D) (see FIGS. 7A and 7D), or a cone scan pattern (B+E) (see FIGS. 7B and 7E). Each scan pattern or path 15 has unique benefits and attributes, for example a scan pattern or path that creates a flat plane (A+C) can produce a laser field wall that is easy to manipulate, while a laser tube (A+D) or cone path (B+E)

can allow for two exposures of the material that passes through it. Line scanning and/or circular or oval scanning laser systems 40 can be used.

FIGS. 8A-8D illustrates examples of how one or more laser beams 12 can be bounced around in a path 15 inside a tube 11 for maximum exposure. The laser light or beam 12 enters a vessel/chamber/tube/pipe 11, which has a liquid or fluid therein, or flowing through it, e.g., contaminated liquid 20, at an angle other than 90 degrees, and can be bounced around with mirrors 80 that are placed either inside the vessel/chamber/tube/pipe 11 (see FIGS. 8C-8D) or on the outside of the vessel/chamber/tube/pipe 11 (see FIG. 8A-8B) behind fused silica (or other appropriate material) windows 90, for example. Having the mirrors 80 on the outside of a fused silica window 90 can help keep the mirrors clean. The laser path 15 can terminate at a target 100, in the liquid over a distance (see FIG. 8D), or on the wall of the tube (see FIG. 8A-C). The target 100 can be simply an inert energy dump material or can be made of a material that will facilitate plasma formation and cavitation bubbles.

Figure 8A:
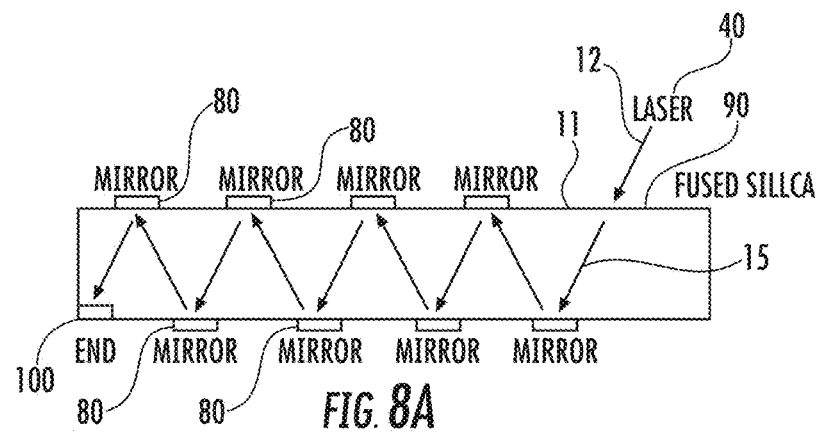
FIGS. 8A-8D illustrate examples of how one or more laser scans can be bounced around inside a vessel, chamber, tube or pipe for maximum exposure in various embodiments of the method of the present invention.
Figure 8B:
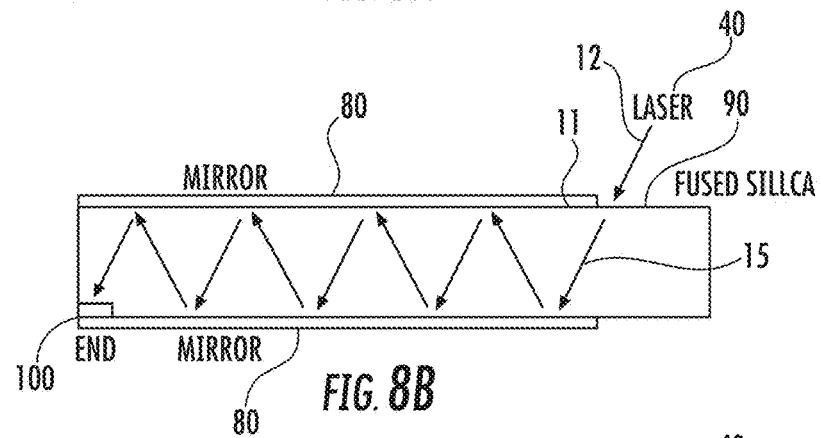
Figure 8C:
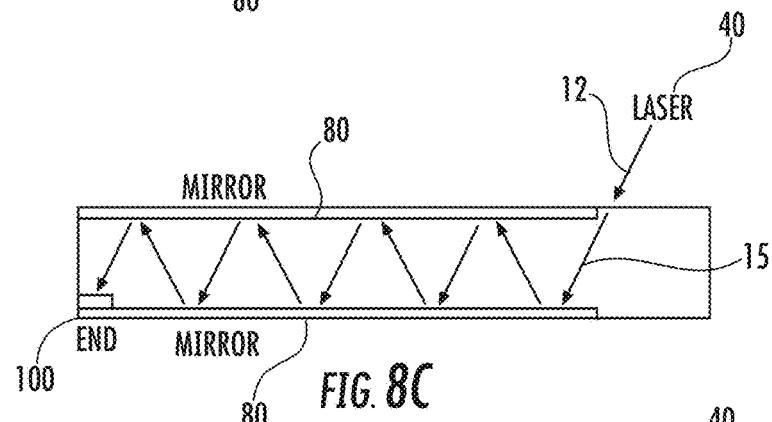
Figure 8D:
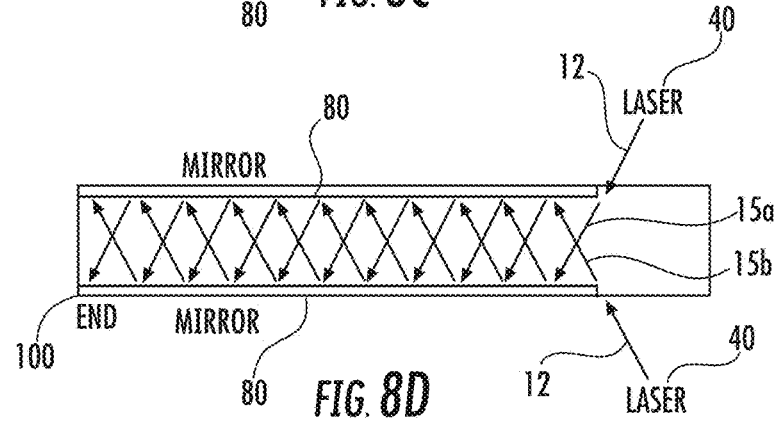

As illustrated in FIG. 8A, the mirrors 80 can be spaced apart from one another a selected distance on top and bottom portions of a vessel/container/tube/pipe 11, wherein the top mirrors 80 are positioned offset from the bottom mirrors 80. As illustrated in 8B-8D, alternatively a single larger mirror 80 can be placed on interior or exterior top and bottom portions, over the entire length of the vessel/tube/container/pipe 11 for which the laser energy 12 will travel in a path 15. In the examples of FIG. 8A-C a single laser source or scanner 40 is used to provide laser energy 12 that bounces around the mirrors within the container in a path 15. In FIG. 8D two lasers 40 are utilized. The two laser scanners 40 may be set to the same or different wavelengths to target one or more types of hydrocarbons or contaminates present in the liquid. If both laser scanners 40 are set to the same wavelength, it will increase the exposure of the liquid to the laser energy of the particular wavelength. If the laser scanners 40 are set to different wavelengths, then more than one type of hydrocarbon or contaminate may be targeted at the same time. In various embodiments any desired number of laser scanners 40, e.g., 1 or 2 or 3 or 4 or 5 or 6 or more as desired may be utilized to maximize exposure of the liquid to a particular laser wavelength or to target multiple contaminants at one time.

FIG. 9 is a three dimensional rendering example of a laser path 15 from FIG. 8. As illustrated, the laser light or energy 12 "wall" or plane bounces around in the vessel/container/tube/pipe 11, increasing the amount of exposure the liquid 20 gets to the laser energy 12 as it flows through the vessel/container/tube/pipe 11.

FIG. 10 is a schematic diagram of an embodiment of the process of the present invention wherein contaminated liquid 20 flows into a container or vessel or pipe 11 to undergo a laser ablation process, wherein separated or transformed hydrocarbons or other contaminants are separated from the contaminated liquid 20 and flowed to a collection chamber 16, e.g., continuously flowing therethrough, and wherein clean or processed water 30 exits the container or pipe or vessel 11 after being exposed to the laser energy. A similar process can be performed with a submergible vessel. A similar process can also be performed wherein rather than continuously flowing through vessel or pipe 11, the contaminated water enters a vessel or pipe or chamber 11 and stops flowing to undergo a laser ablation process. After the laser ablation process it can then be flowed to an exit. After the laser ablation process contaminants can also be flowed to a collection chamber or series of chambers. Skimmer devices such as spillover weirs, rotatable paddles, or flight and rake systems, may be used to assist with removal and flow of separated materials to a collection chamber or collections sump 16. A collection chamber or series of chambers, perforated membranes, or a ventilation system can also be integrated to collect and separate the gasses that are created in the ablation process.

Figure 11:
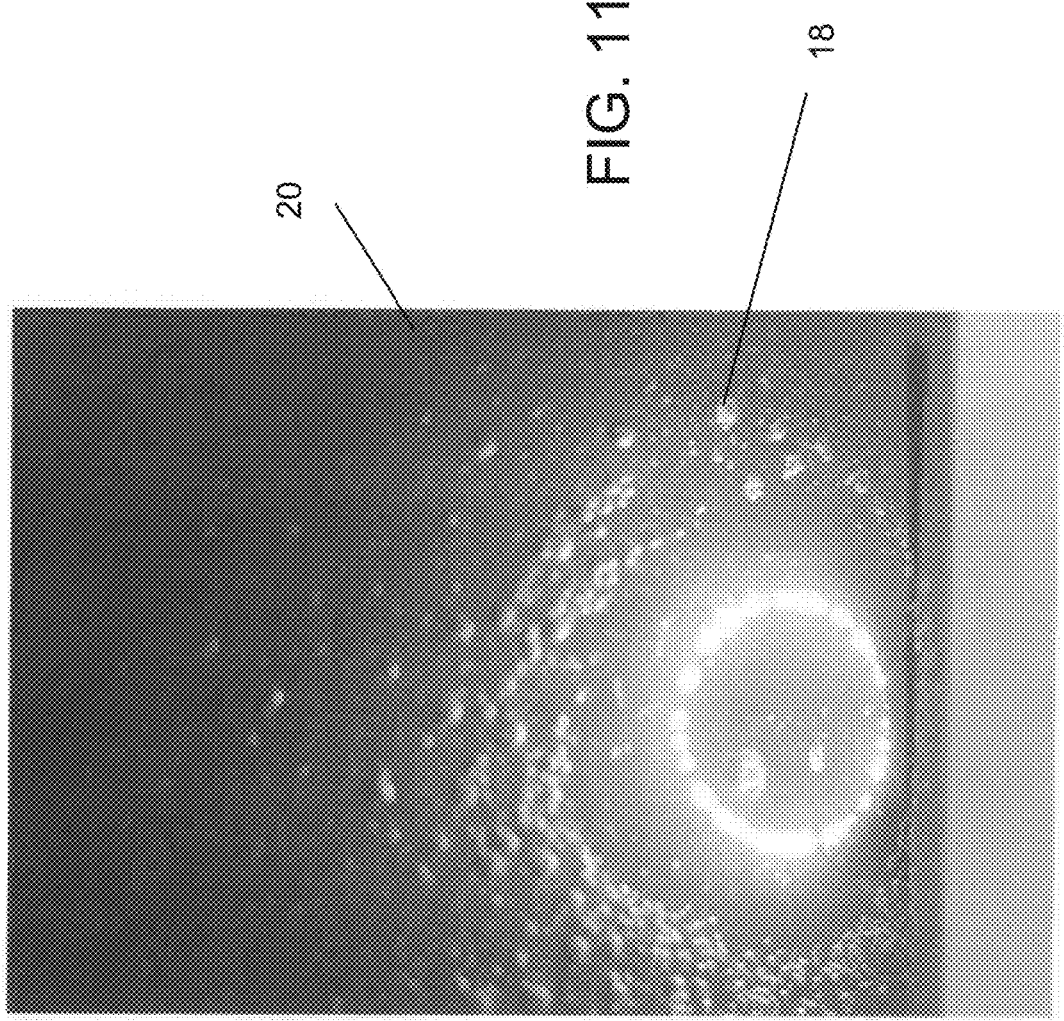
FIGS. 11-12 are images of bubbles formed in water during a laser ablation process.
Figure 12:
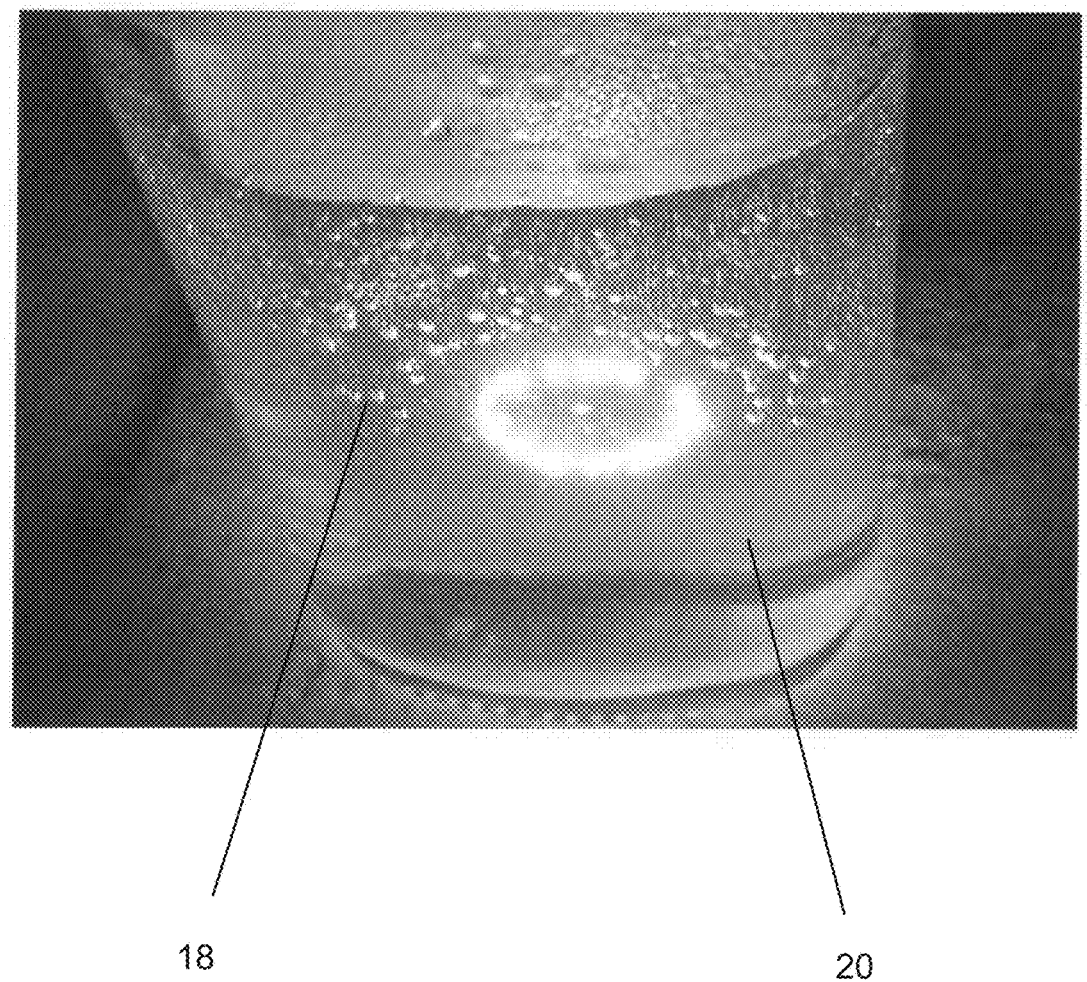
Figure 13:
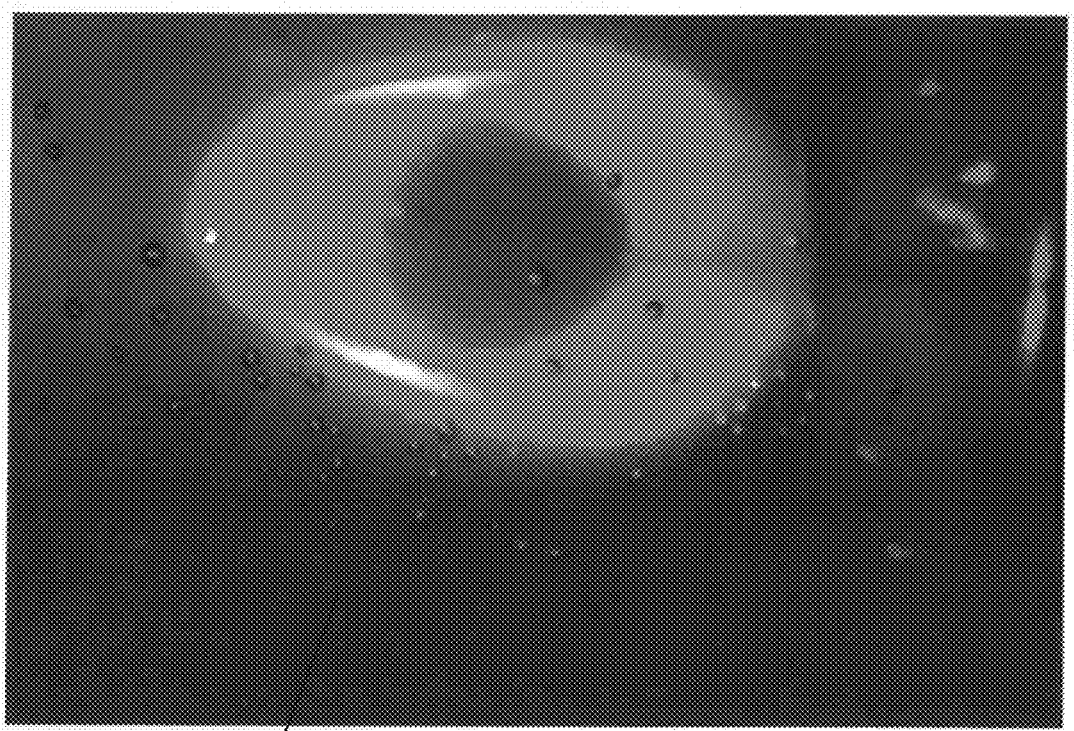
FIG. 13 is an image of contaminated water with a red aiming beam used in the dark to show the path that the laser energy would follow.

FIGS. 11-13 show bubbles 18 formed during a laser ablation process. FIG. 11 illustrates contaminated liquid 20 that is darker in color than the contaminated liquid 20 of FIG. 12. Bubbles are starting to form in FIG. 11, with more present in FIG. 12 and with the bubbles rising. FIG. 13 illustrates a photo that was taken after a red aiming beam was used in the dark, that shows the path of the laser energy through the liquid. This red aiming beam is replaced by the actual laser beam during the process.

In order to confirm repeatability, depending on the parameters and laser power being used, 1-5 minutes exposure to laser energy such as shown in the figures, gives noticeable, visible, purifying results.

The following is a list of parts and materials suitable for use in the present invention:

| PARTS LIST: | |
| --- | --- |
| PART NUMBER | DESCRIPTION |
| 10 | laser ablation apparatus |
| 11 | vessel/container/tube/pipe |
| 12 | laser energy/light/radiation/beam |
| 13 | absorption and fluorescence data |
| 15 | path |
| 16 | collection chamber/reservoir/sump |
| 18 | bubble |
| 20 | contaminated water/liquid/fluid |
| 30 | purified/processed water |
| 40 | laser source/laser scanner |
| 60 | optic |
| 70 | focusing lens |
| 80 | mirror |
| 90 | window |
| 100 | target |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A laser ablation and filtration process for removing one or more contaminates, including hydrocarbons, from a liquid comprising the following steps:
   a. housing the liquid in a vessel; and
   b. cleaning or purifying the liquid by directing laser energy from a laser source through the liquid, wherein the laser energy has at least one wavelength that denatures, renders inert, breaks down, neutralizes, vaporizes and/or separates the hydrocarbons from the liquid, and wherein the at least one wavelength is selected from a range of 400 nm to 570 nm.

2. The process of claim 1 further comprising a step of gathering absorption, fluorescence and/or microscopy data of the liquid before directing laser energy through the liquid.

3. The process of claim 2 further comprising a step of gathering absorption, fluorescence and/or microscopy data of the one or more contaminates in the liquid before directing laser energy through the liquid.

4. The process of claim 3 further comprising a step of tuning the laser source to the at least one wavelength which is a desired wavelength of pulsed, modulated, or continuous wave laser energy wherein the laser energy will pass through the liquid and will be absorbed by at least the hydrocarbons, and wherein laser energy having a second wavelength is also selected and directed to the liquid, the second wavelength selected from one of the following ranges:
i) 495 nm to 570 nm; or
ii) 900 to 1064 nm.

5. The process of claim 4 further comprising a step of selecting a desired laser path for the laser energy to travel within the vessel and through the liquid.

6. The process of claim 1 wherein the laser source includes one or more tuning parameters, and the one or more tuning parameters for the laser source include wavelength, fluence, pulse duration, modulation rate, pulse profile, beam diameter, pulse frequency, energy, and/or focal distance.

7. The process of claim 5 wherein the laser energy is directed along the laser path for a desired time interval.

8. The process of claim 1 wherein the contaminated liquid is set to a temperature in a desired pre-set temperature range.

9. The process of claim 1 wherein in step 1 the laser energy is fired directly into the liquid from the source.

10. The process of claim 1 wherein the laser energy from the laser source is directed into the contaminated liquid with assistance of a delivery system such as mirrors, fiber optics, articulated arms, and laser scanners.

11. The process of claim 1 wherein a desired energy density or fluence of the laser energy that is needed to facilitate a reaction can be achieved by firing the laser energy directly from the laser source.

12. The process of claim 1 wherein a desired energy density or fluence of the laser energy that is needed to facilitate a reaction can be achieved by using optics, including collimators, mirrors, prisms, custom optics, and/or focusing lenses to achieve desired parameters.

13. A laser ablation and filtration apparatus comprising:
a vessel for receiving a liquid containing contaminates, including hydrocarbons; and
a laser source tuned for directing laser energy through the liquid at a wavelength selected from a range of 495-570 nm for denaturing, rendering inert, neutralizing, vaporizing and/or separating the hydrocarbons from the liquid.

14. The apparatus of claim 13 further comprising a collection container for collecting separated contaminates and by-products.

15. The apparatus of claim 13 wherein the laser source is positioned outside the vessel and further comprising a window through which laser energy is directed to the contaminated liquid.

16. The apparatus of claim 13 further comprising one or more mirrors for directing a path of the laser energy through the vessel.

17. The apparatus of claim 16 wherein the mirrors are on the outside of the vessel.

18. The apparatus of claim 16 wherein the mirrors are on the inside of the vessel.

19. The apparatus of claim 14 further comprising one or more optics, including collimators, mirrors, prisms, custom optics, and focusing lenses to achieve desired parameters.

20. The apparatus of claim 13 further comprising more than one laser source.

21. The apparatus of claim 13 wherein the laser source is positioned based on desired parameters to maximize exposure of the liquid to the laser energy, including sizing parameters, angle and inclination of the laser, retention time for a laser process to be applied and geometry of the containment for proper inclination.

22. The apparatus of claim 13 further comprising a series of collection chambers, perforated membranes, and a ventilation system integrated to collect and separate gases and other by-products that are created.

23. The apparatus of claim 19 wherein the collection container is physically separated from a path of the laser energy.

24. The apparatus of claim 19 wherein the collection container is optically separated from a path of the laser energy.

25. The apparatus of claim 13 wherein the vessel is configured for performing an ablation process outside of a body of water.

26. The apparatus of claim 13 wherein the vessel is submergible within a body of water, an ocean, a lake, or a reservoir.

27. The apparatus of claim 13 wherein the vessel is submergible within a cell housing the contaminated liquid.

28. The apparatus of claim 26 wherein the body of water includes the contaminated liquid and the vessel is mobile within the body of water for moving through the contaminated liquid during an ablation process, while directing laser energy at the contaminated liquid.

29. The apparatus of claim 26 wherein the vessel is floatable for floating within the contaminated liquid during an ablation process.

30. A laser ablation and filtration apparatus comprising:
a vessel for purifying a fluid containing contaminates, including hydrocarbons, the vessel including a laser source that is tuned for directing laser light energy of at least one wavelength selected from a range of 400 nm to 570 nm through the fluid to be purified for denaturing, rendering inert, neutralizing, vaporizing and/or separating the hydrocarbons from the fluid.

31. The apparatus of claim 30 wherein the vessel is submergible within the fluid to be purified.

32. The apparatus of claim 31 wherein laser energy is directed outside the vessel to target the hydrocarbons in the fluid.

33. The apparatus of claim 31 wherein fluid is flowed into the vessel and laser energy is directed within the vessel to target the hydrocarbons in the fluid.

34. The process of claim 1 wherein the at least one wavelength of the laser energy is selected from a visible light spectrum in the range of 495 to 570.

35. The process of claim 1 wherein the at least one wavelength of the laser energy is selected from a visible light spectrum in a range of 400 to 494.

36. The process of claim 1 wherein a second wavelength of laser energy is selected from a range of 1100 nm to 1220 nm.

37. The process of claim 1 wherein a second wavelength of the laser energy is selected from a range of 266 nm to 1064 nm.

38. The process of claim 34 wherein the at least one wavelength selected is 532 nm.

39. The process of claim 38 wherein the laser energy includes more than one wavelength and wherein the more than one wavelengths that are selected include 532 nm and 1064 nm wavelengths.

40. The apparatus of claim 30 wherein the at least one wavelength is selected from a range of 495-570 nm.

41. The process of claim 1 wherein a second wavelength is selected from a range of 900-1220 nm.

42. The apparatus of claim 30 wherein the at least one wavelength is selected from a visible light spectrum in the range of 495 to 570, and further including another laser source tunable to a second wavelength in the range of 900 to 1064 nm.

43. The apparatus of claim 30 wherein the at least one wavelength selected is 532 nm, and further including another laser source that is tunable to a second wavelength of 1064 nm.

44. The apparatus of claim 13 wherein the apparatus further includes another laser source that is tunable to a second wavelength selected from the range of 900-1064.

\* \* \* \* \*